(12) United States Patent
Chae

(10) Patent No.: US 8,074,551 B2
(45) Date of Patent: Dec. 13, 2011

(54) CUTTING WHEEL FOR LIQUID CRYSTAL DISPLAY PANEL

(75) Inventor: Kyung-Su Chae, Daegu-Kwangyokshi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/184,082

(22) Filed: Jun. 28, 2002

(65) Prior Publication Data

US 2003/0159297 A1    Aug. 28, 2003

(30) Foreign Application Priority Data

Feb. 26, 2002  (KR) ................... 2002-10311
Feb. 26, 2002  (KR) ................... 2002-10312

(51) Int. Cl.
*B26B 9/02*    (2006.01)
(52) U.S. Cl. .............. 83/886; 83/879; 30/355; 225/2
(58) Field of Classification Search ............ 83/471.1, 83/495, 500, 469, 835, 879–882, 886, 887, 83/846; 30/347, 355, 357, 358, 362; 451/548, 451/549; 225/1–5, 93, 94
See application file for complete search history.

(56) References Cited

U.S. PATENT DOCUMENTS

| | | | |
|---|---|---|---|
| 2,762,954 A * | 9/1956 | Leifer | 257/41 |
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,024,026 A * | 6/1991 | Korb | 451/542 |
| 5,197,453 A * | 3/1993 | Messina | 125/15 |
| 5,247,377 A | 9/1993 | Omeis et al. | |
| 5,263,888 A | 11/1993 | Ishihara et al. | |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | |
| 5,539,545 A | 7/1996 | Shimizu et al. | |
| 5,548,429 A | 8/1996 | Tsujita | |
| 5,569,285 A * | 10/1996 | Webb | 606/180 |
| 5,579,754 A * | 12/1996 | Chiuminatta et al. | 125/13.01 |
| 5,642,214 A | 6/1997 | Ishii et al. | |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,907,984 A * | 6/1999 | Herman et al. | 83/24 |

(Continued)

FOREIGN PATENT DOCUMENTS

EP    1 003 066 A1    5/2000

(Continued)

*Primary Examiner* — Phong Nguyen
(74) *Attorney, Agent, or Firm* — McKenna Long & Aldridge LLP

(57) ABSTRACT

A cutting assembly for cutting a substrate has two circular cutting wheels. The cutting wheels are bonded together as a unitary unit. Each cutting wheel has cutting protrusions on its circumference. The cutting assembly creates two lines of intermittent cuts on the substrate.

5 Claims, 9 Drawing Sheets

U.S. PATENT DOCUMENTS

| | | | |
|---|---|---|---|
| 5,952,676 A | 9/1999 | Sato | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,016,178 A | 1/2000 | Kataoka et al. | |
| 6,016,181 A | 1/2000 | Shimada | |
| 6,055,035 A | 4/2000 | von Gutfeld et al. | |
| 6,163,357 A | 12/2000 | Nakamura | |
| 6,219,126 B1 | 4/2001 | von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,390,086 B1 * | 5/2002 | Collins et al. | 125/13.01 |
| 6,413,150 B1 * | 7/2002 | Blair | 451/41 |
| 6,414,733 B1 | 7/2002 | Ishikawa et al. | |
| 2001/0021000 A1 | 9/2001 | Egami | |

FOREIGN PATENT DOCUMENTS

| | | |
|---|---|---|
| EP | 1003066 A1 | 5/2000 |
| JP | 51-65656 | 6/1976 |
| JP | 51-065656 | 6/1976 |
| JP | 57-038414 | 6/1976 |
| JP | 57038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | 62-054229 | 3/1987 |
| JP | S62-054228 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62-205319 | 9/1987 |
| JP | 62205319 | 9/1987 |
| JP | S62-054225 | 9/1987 |
| JP | 63-109413 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 05-265011 | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | H06-018829 | 1/1994 |
| JP | 06-051256 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 06-265915 | 9/1994 |
| JP | 06265915 | 9/1994 |
| JP | 06-313870 | 11/1994 |
| JP | 07-084268 | 3/1995 |
| JP | 07-128674 | 5/1995 |
| JP | 07128674 | 5/1995 |
| JP | 07-181507 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 08-101395 | 4/1996 |
| JP | 08-106101 | 4/1996 |
| JP | 08095066 | 4/1996 |
| JP | 08106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240807 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-061829 | 3/1997 |
| JP | 09-61829 | 3/1997 |
| JP | 09-073075 | 3/1997 |
| JP | 09-073096 | 3/1997 |
| JP | 09073075 | 3/1997 |
| JP | 09073096 | 3/1997 |
| JP | H09-094500 | 4/1997 |
| JP | 09-127528 | 5/1997 |
| JP | 09127528 | 5/1997 |
| JP | 09-230357 | 9/1997 |
| JP | 09230357 | 9/1997 |
| JP | 09-281511 | 10/1997 |
| JP | 09281511 | 10/1997 |
| JP | 09311340 | 12/1997 |
| JP | 10-123537 | 5/1998 |
| JP | 10-123538 | 5/1998 |
| JP | 10-142616 | 5/1998 |
| JP | 63-110425 | 5/1998 |
| JP | 10123537 | 5/1998 |
| JP | 10123538 | 5/1998 |
| JP | 10142616 | 5/1998 |
| JP | 10-177178 | 6/1998 |
| JP | H10-174924 | 6/1998 |
| JP | 10-221700 | 8/1998 |
| JP | 10221700 | 8/1998 |
| JP | 10-282512 | 10/1998 |
| JP | 10282512 | 10/1998 |
| JP | 10-333157 | 12/1998 |
| JP | 10-333159 | 12/1998 |
| JP | 11-014953 | 1/1999 |
| JP | 11014953 | 1/1999 |
| JP | 11-038424 | 2/1999 |
| JP | 11038424 | 2/1999 |
| JP | 11-064811 | 3/1999 |
| JP | 11064811 | 3/1999 |
| JP | 11-109388 | 4/1999 |
| JP | 11-116260 | 4/1999 |
| JP | 11109388 | 4/1999 |
| JP | 11-133438 | 5/1999 |
| JP | 11-142864 | 5/1999 |
| JP | 11-174477 | 7/1999 |
| JP | 11174477 | 7/1999 |
| JP | 11-212045 | 8/1999 |
| JP | 11212045 | 8/1999 |
| JP | 11-248930 | 9/1999 |

| | | | | | | |
|---|---|---|---|---|---|---|
| JP | H11-262712 | 9/1999 | | JP | 2001-330840 | 11/2001 |
| JP | H11-264991 | 9/1999 | | JP | 2001330840 | 11/2001 |
| JP | 11-326922 | 11/1999 | | JP | 2001-356353 | 12/2001 |
| JP | 11-344714 | 12/1999 | | JP | 2001-356354 | 12/2001 |
| JP | 11344714 | 12/1999 | | JP | 2001356354 | 12/2001 |
| JP | 2000-002879 | 1/2000 | | JP | 2002-014360 | 1/2002 |
| JP | 2000-029035 | 1/2000 | | JP | 2002-023176 | 1/2002 |
| JP | 2000029035 | 1/2000 | | JP | 2002014360 | 1/2002 |
| JP | 2000-056311 | 2/2000 | | JP | 2002023176 | 1/2002 |
| JP | 2000-066165 | 3/2000 | | JP | 2002-049045 | 2/2002 |
| JP | 2000-066218 | 3/2000 | | JP | 2002049045 | 2/2002 |
| JP | 2000-093866 | 4/2000 | | JP | 2002-079160 | 3/2002 |
| JP | 2000-137235 | 5/2000 | | JP | 2002-080321 | 3/2002 |
| JP | 2000-147528 | 5/2000 | | JP | 2002-082340 | 3/2002 |
| JP | 3000-147528 | 5/2000 | | JP | 2002-090759 | 3/2002 |
| JP | 2000-193988 | 7/2000 | | JP | 2002-090760 | 3/2002 |
| JP | 2000-241824 | 9/2000 | | JP | 2002082340 | 3/2002 |
| JP | 2000-284295 | 10/2000 | | JP | 2002090759 | 3/2002 |
| JP | 2000-292799 | 10/2000 | | JP | 2002090760 | 3/2002 |
| JP | 2000-310759 | 11/2000 | | JP | 2002-107740 | 4/2002 |
| JP | 2000-310784 | 11/2000 | | JP | 2002-122870 | 4/2002 |
| JP | 2000-338501 | 12/2000 | | JP | 2002-122872 | 4/2002 |
| JP | 2001-005401 | 1/2001 | | JP | 2002-122873 | 4/2002 |
| JP | 2001-005405 | 1/2001 | | JP | 2002107740 | 4/2002 |
| JP | 2001-013506 | 1/2001 | | JP | 2002122872 | 4/2002 |
| JP | 2001-033793 | 2/2001 | | JP | 2002122873 | 4/2002 |
| JP | 2001-042341 | 2/2001 | | JP | 2002-131762 | 5/2002 |
| JP | 2001-051284 | 2/2001 | | JP | 2002-139734 | 5/2002 |
| JP | 2001-066615 | 3/2001 | | JP | 2002-156518 | 5/2002 |
| JP | 2001-091727 | 4/2001 | | JP | 2002-169166 | 6/2002 |
| JP | 2001-117105 | 4/2001 | | JP | 2002-169167 | 6/2002 |
| JP | 2001-117109 | 4/2001 | | JP | 2002-182222 | 6/2002 |
| JP | 2001117105 | 4/2001 | | JP | 2002080321 | 6/2002 |
| JP | 2001-133745 | 5/2001 | | JP | 2002-202512 | 7/2002 |
| JP | 2001-133794 | 5/2001 | | JP | 2002-202514 | 7/2002 |
| JP | 2001-133799 | 5/2001 | | JP | 2002-214626 | 7/2002 |
| JP | 2001-142074 | 5/2001 | | JP | 2002202512 | 7/2002 |
| JP | 2001-147437 | 5/2001 | | JP | 2002202514 | 7/2002 |
| JP | 2001133794 | 5/2001 | | JP | 2002214626 | 7/2002 |
| JP | 2001142074 | 5/2001 | | JP | 2002-229042 | 8/2002 |
| JP | 2001147437 | 5/2001 | | JP | 2002-236276 | 8/2002 |
| JP | 2001-154211 | 6/2001 | | JP | 2002-258299 | 8/2002 |
| JP | 2001-166272 | 6/2001 | | JP | 2002-236292 | 9/2002 |
| JP | 2001-166310 | 6/2001 | | JP | 2002-277865 | 9/2002 |
| JP | 2001154211 | 6/2001 | | JP | 2002-277866 | 9/2002 |
| JP | 2001-183683 | 7/2001 | | JP | 2002-277881 | 9/2002 |
| JP | 2001-201750 | 7/2001 | | JP | 2002-287156 | 10/2002 |
| JP | 2001-209052 | 8/2001 | | JP | 2002-296605 | 10/2002 |
| JP | 2001-209056 | 8/2001 | | JP | 2002-311438 | 10/2002 |
| JP | 2001-209057 | 8/2001 | | JP | 2002-311440 | 10/2002 |
| JP | 2001-209058 | 8/2001 | | JP | 2002-311442 | 10/2002 |
| JP | 2001-209060 | 8/2001 | | JP | 2002-323687 | 11/2002 |
| JP | 2001-215459 | 8/2001 | | JP | 2002-323694 | 11/2002 |
| JP | 2001-222017 | 8/2001 | | JP | 2002-333628 | 11/2002 |
| JP | 2001-235758 | 8/2001 | | JP | 2002-333635 | 11/2002 |
| JP | 2001-215459 | 9/2001 | | JP | 2002-333843 | 11/2002 |
| JP | 2001-255542 | 9/2001 | | JP | 2002-341329 | 11/2002 |
| JP | 2001-264782 | 9/2001 | | JP | 2002-341355 | 11/2002 |
| JP | 2001255542 | 9/2001 | | JP | 2002-341356 | 11/2002 |
| JP | 2001264782 | 9/2001 | | JP | 2002-341357 | 11/2002 |
| JP | 2001-201750 | 10/2001 | | JP | 2002-341358 | 11/2002 |
| JP | 2001-272640 | 10/2001 | | JP | 2002-341359 | 11/2002 |
| JP | 2001-281675 | 10/2001 | | JP | 2002-341362 | 11/2002 |
| JP | 2001-281678 | 10/2001 | | KR | 2000-0035302 | 6/2000 |
| JP | 2001-282126 | 10/2001 | | | | |
| JP | 2001-305563 | 10/2001 | | | | |
| JP | 2001-330837 | 11/2001 | | | | |

* cited by examiner

CUTTING WHEEL FOR LIQUID CRYSTAL DISPLAY PANEL

This application claims the benefit of Korean Patent Application Nos. 2002-10311 and 2002-10312, filed on Feb. 26, 2002, which is hereby incorporated by reference for all purposes as if fully set forth herein.

This application incorporates by reference two co-pending application Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME", as if fully set forth herein.

BACKGROUND OF THE INVENTION

1. Field of the Invention

The present invention relates to a cutting wheel for a liquid crystal display panel, and more particularly, to a cutting wheel for a liquid crystal display panel for dividing liquid crystal display panels fabricated on a large-sized glass substrate into individual unit panels by cutting.

2. Discussion of the Related Art

Generally, a liquid crystal display (hereinafter abbreviated LCD) is a display apparatus enabling display of images by supplying liquid crystal cells arranged in a matrix with data signals according to image information to control light transmittance of the respective liquid crystal cells.

LCDs are fabricated by forming thin film transistor (hereinafter abbreviated TFT) array substrates on a large-sized first mother substrate and color filter (hereinafter abbreviated CF) substrates on a second mother substrate and bonding the two mother substrates to each other, thereby fabricating multiple unit liquid crystal display panels simultaneously to improve yield. Hence, LCDs require cutting the bonded mother substrates into a plurality of unit panels.

The cutting process for the unit panels is generally carried out by forming a cutting groove on a surface of the mother substrate using a wheel having a hardness that is greater than that of glass and making a crack propagate along the cutting groove. The cutting process of the unit panel in such an LCD is explained by referring to the attached drawings in detail as follows.

FIG. 1 illustrates a schematic layout of a unit liquid crystal display panel prepared by bonding TFT array and CF substrates to each other.

Referring to FIG. 1, a liquid crystal display panel 10 includes an image display part 13 having liquid crystal cells arranged in a matrix, a gate pad part 14 connected to gate lines of the image display part 13, and a data pad part 15 connected to data lines the image display part 13. In this case, the gate and data pad parts 14 and 15 are formed in a peripheral area of a TFT array substrate 1 which is not overlapped with a CF substrate 2. The gate pad part 14 supplies the gate lines of the image display part 13 with scan signals supplied from a gate driver integrated circuit, while the data pad part 15 supplies the data lines of the image display part 13 with image information supplied from a data driver integrated circuit.

The data and gate lines to which the image information and scan signals are applied respectively cross each other on the TFT array substrate 1 of the image display part 13. At the crossings of the gate and data lines, thin film transistors (not shown) are formed for switching signals to liquid crystal cells. Pixel electrodes are connected to the thin film transistors respectively to apply electric fields to the liquid crystal cells. A passivation layer (not shown) is formed on an entire surface to protect the data lines, gate lines, thin film transistors, and electrodes.

Color filters (not shown) are formed by coating and are separated by a black matrix and a transparent common electrode (not shown) on the CF substrate 2. The common electrode serves as a counter electrode to the pixel electrode on the TFT array substrate 1.

The above-constructed TFT array and CF substrates 1 and 2 are provided with a cell gap therebetween making the substrates 1 and 2 face each other by a uniform distance. The substrates 1 and 2 are bonded to each other by a sealant (not shown) formed at a periphery of the image display part 13, and a liquid crystal layer (not shown) in a space between the TFT array and CF substrates 1 and 2.

FIG. 2 illustrates a cross-sectional view of first and second mother substrates bonded to each other to form a plurality of unit liquid crystal display panels. A plurality of TFT array substrates 1 and a corresponding plurality of CF substrates 2 are formed on the first and second mother substrates, respectively.

Referring to FIG. 2, unit liquid crystal display panels are formed so that one side of each TFT array substrate 1 extends beyond a side of the corresponding CF substrate 2. This is because the gate and data pad parts 14 and 15 are formed on a periphery of the TFT array substrate 1 in an area not overlapped with the corresponding CF substrate 2.

Therefore, an area between adjacent CF substrates 2 on the second mother substrate 30 is as wide as a first dummy area 31 that corresponds to an area of the extension of the respective TFT array substrate on the first mother substrate 20.

Moreover, the unit liquid crystal display panels are arranged properly for a maximum use of the first and second mother substrates 20 and 30. Generally, the unit liquid crystal display panels are formed to be spaced apart from each other as wide as second dummy areas 32, respectively. Third dummy areas 21 are formed at edges of the first and second mother substrates 20 and 30 for a process margin.

After the first mother substrate 20 having the TFT array substrates 1 has been bonded to the second mother substrate 30 having the CF substrates 2, liquid crystal display panels are cut individually. In this case, the first dummy area 31, the second dummy areas 32, and the third dummy areas 21 are removed simultaneously.

FIGS. 3A and 3B illustrate front and side views of a cutting wheel used in cutting liquid crystal display panels.

Referring to FIGS. 3A and 3B, a penetrating hole 41 is formed at a center of a circular cutting wheel 40 to receive a support spindle (not shown), and a sharp blade 42 is formed along an edge of the cutting wheel 40 by grinding front and back faces of the cutting wheel 40.

The cutting wheel 40 rotates and is brought into close contact with a liquid crystal display panel to form a groove having a predetermined depth. After the groove has been formed in the liquid crystal display panel, a crack propagates downward through an applied external impact to cut the liquid crystal display panel.

However, the above-constructed cutting wheel 40 is vulnerable to slipping, which can result in an abnormal groove on the liquid crystal display panel and an inability to control precisely the propagating direction of the cracking and having a required high pressure for adherence between the cutting wheel 40 and liquid crystal display panel to form the groove having a designed depth.

FIGS. 4A and 4B illustrate front and side views of another cutting wheel used in cutting liquid crystal display panels.

Referring to FIGS. 4A and 4B, a penetrating hole 51 is formed at a center of a circular cutting wheel 50 to receive a support spindle (not shown), and a plurality of sharp blades 52 are formed along an edge of the cutting wheel 50 to be spaced apart by a uniform interval to have an uneven or serrated structure.

The cutting wheel 50 shown in FIGS. 4A and 4B rotates and is brought into close contact with a liquid crystal display panel to form a groove having a predetermined depth by applying a uniform pressure thereto, like the other cutting wheel 40 in FIGS. 3A and 3B.

Compared to the cutting wheel 40 shown in FIGS. 3A and 3B, the cutting wheel 50 shown in FIGS. 4A and 4B uses the uneven-structured blades 52 to prohibit slipping on the liquid crystal display panel to prevent the formation of an abnormal groove. Moreover, the cutting wheel 50, which comes into tight contact with the liquid crystal display panel while rotating, gives an concentrated impact on the liquid crystal display panel to force the propagation of the crack in a uniform direction. The liquid crystal display panel can be cut even if the pressure making the cutting wheel 50 adhere closely to the liquid crystal display panel is lower than that of the previous cutting wheel 40 shown in FIGS. 3A and 3B.

Thus, the cutting wheel 50 shown in FIGS. 4A and 4B is more advantageous than the previous cutting wheel 40 in FIGS. 3A and 3B. However, the protruding blades 52 are vulnerable to breakage. When particles such as glass are attached to the groove, a normal groove fails to be formed. Hence, the wheel should be changed frequently, thereby reducing productivity as well as increasing production cost due to purchasing costs of new wheels.

Moreover, when the wheel is generally manufactured with tungsten carbide (WC), abrasion of the wheel requires the replacement of wheel after the formation of about 200 m of grooves on a plurality of the liquid crystal display panels. Furthermore, even if the wheel is made of diamond, which has hardness higher than that of tungsten carbide, and the pressure or speed of the wheel is adjusted, the endurance of the wheel is just extended to about 600 m. Such a short endurance of the wheel requires frequent replacements, thereby reducing productivity as well as increasing production cost.

SUMMARY OF THE INVENTION

Accordingly, the present invention is directed to a cutting wheel for a liquid crystal display panel that substantially obviates one or more problems due to limitations and disadvantages of the related art.

An advantage of the present invention is to provide a cutting wheel for a liquid crystal display panel to prevent frequent replacement of a cutting wheel due to the breakage of protruding blades of a cutting wheel having unevenly-shaped blades or particle deposition in a groove. Another advantage is an extended endurance of the cutting wheel.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages and in accordance with the purpose of the invention, as embodied and broadly described herein, a cutting wheel for a liquid crystal display panel includes a circular first and second cutting wheel having a same size and a first and second cutting blade on the first and second cutting wheels, wherein the first and second cutting blades have the same shape.

In another aspect of the present invention, a cutting wheel for a liquid crystal display panel, includes first blades formed along a cutting wheel, the first blades having a first protrusion portion at a first radius and second blades formed along the cutting wheel, the second blades having a first protrusion portion at a second radius and being alternated with the first blades.

In a further aspect of the present invention, a cutting wheel for a liquid crystal display panel includes a first blade formed along an edge of a cutting wheel, the first blades having a first height; and the second blades between the first blades, the second blades having a second height.

In another further aspect of the present invention, a cutting wheel for a liquid crystal display panel includes a first blade formed along an edge of a first cutting wheel, the first blades having a first protrusion portion at a first radius; and a second blade formed along an edge of a second cutting wheel, the second blades having a second protrusion portion at a second radius.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
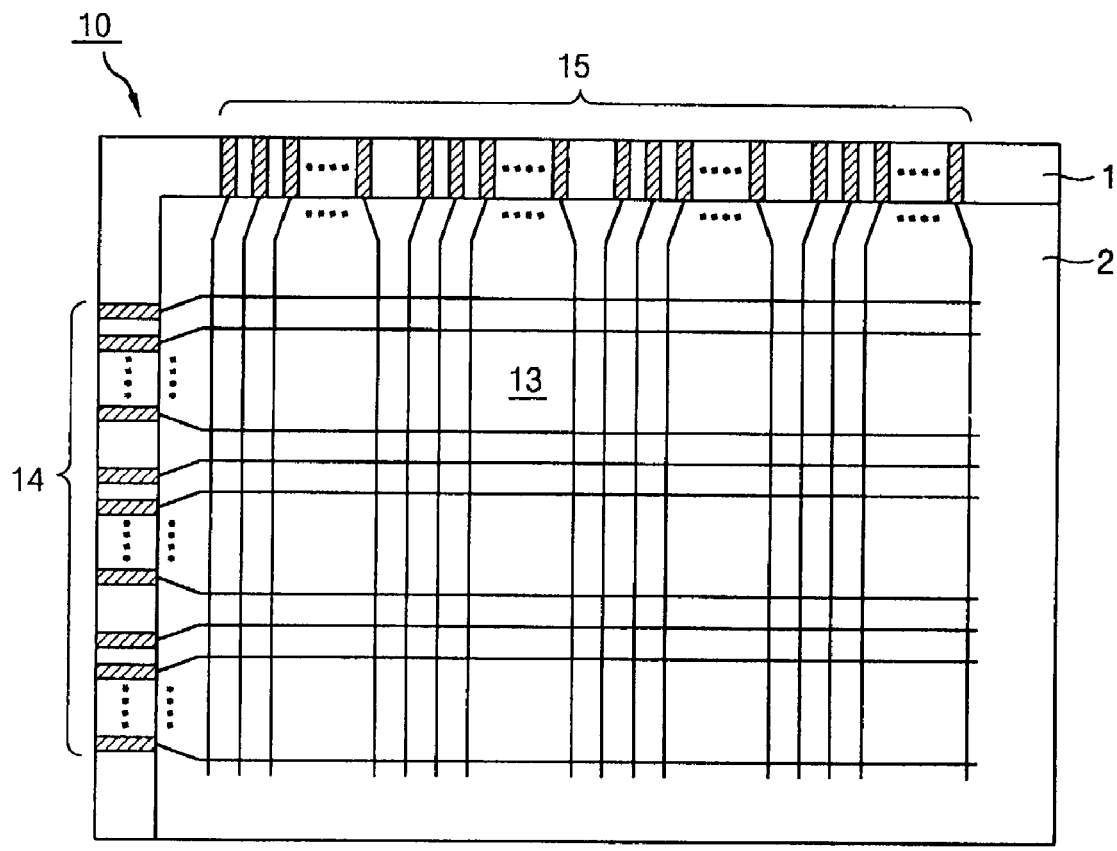
FIG. 1 illustrates a schematic layout of a unit liquid crystal display panel prepared by bonding TFT array and color filter (CF) substrates to face each other.
Figure 2:
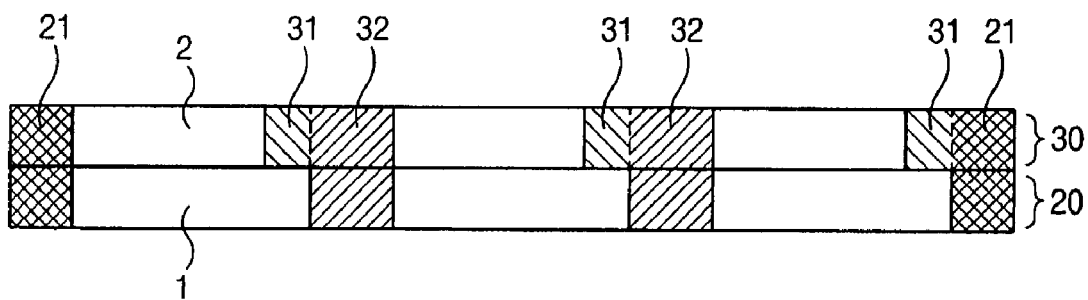
FIG. 2 illustrates a cross-sectional view of first and second mother substrates bonded to each other to form a plurality of unit liquid crystal display panels, in which TFT array substrates and CF substrates are formed on the first and second mother substrates, respectively.
Figure 3A:
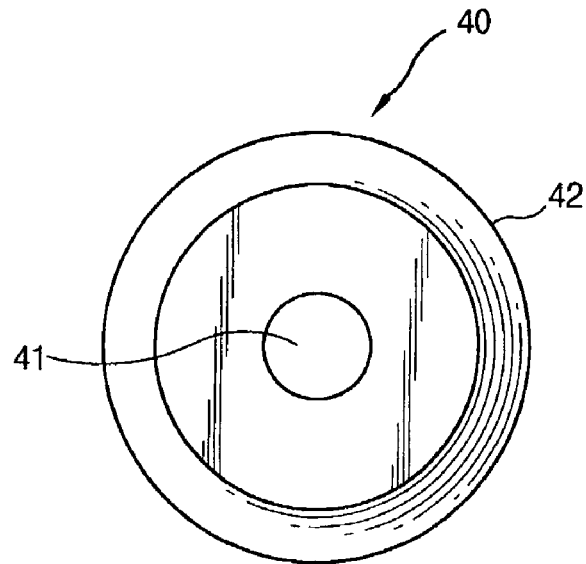
FIGS. 3A and 3B illustrate front and side views of a cutting wheel used in cutting liquid crystal display panels.
Figure 3B:
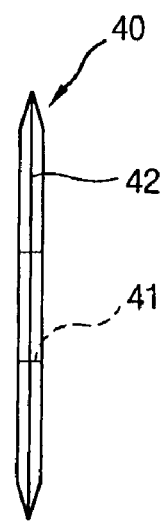
Figure 4A:
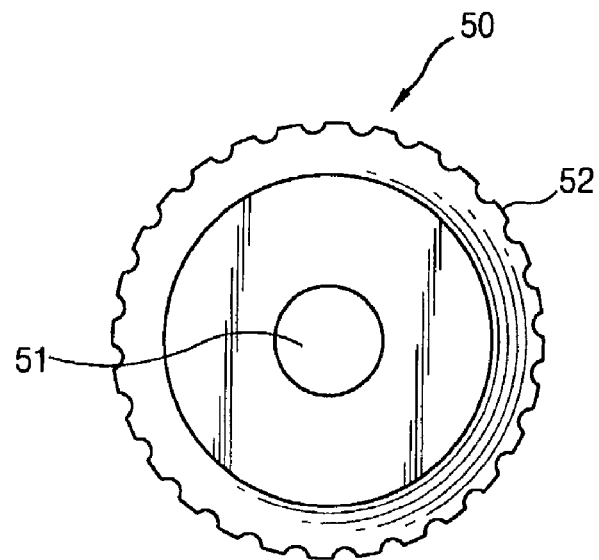
FIGS. 4A and 4B illustrate front and side views of another cutting wheel used in cutting liquid crystal display panels.
Figure 4B:
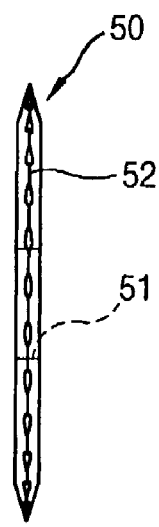
Figure 5:
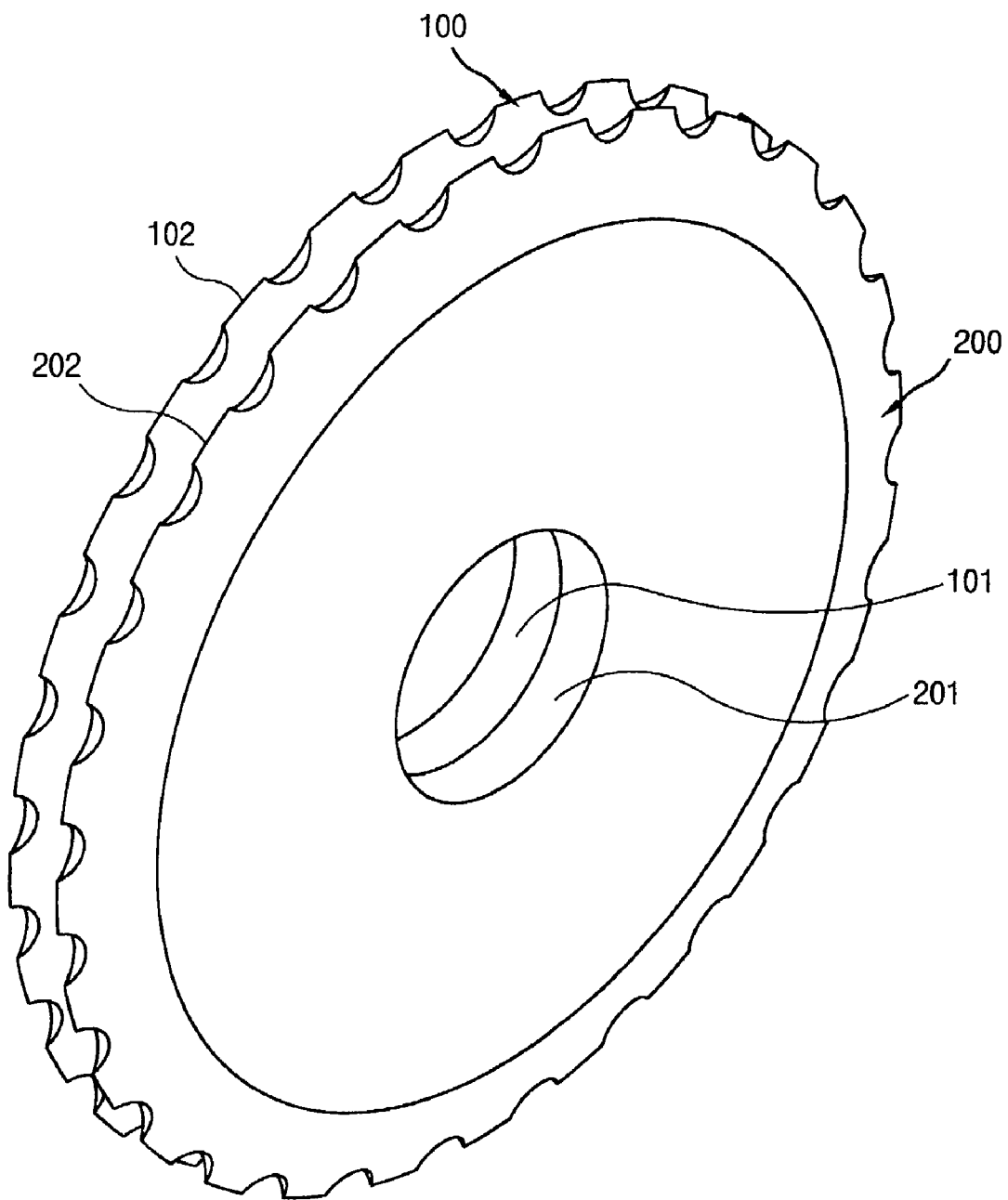
FIG. 5 illustrates a perspective view of a cutting wheel for a liquid crystal display panel according to a first embodiment of the present invention.

FIG. 5 illustrates a perspective view of a cutting wheel for a liquid crystal display panel according to a first embodiment of the present invention.

Referring to FIG. 5, a cutting wheel for a liquid crystal display panel according to a first embodiment of the present invention has a circular shape and includes a first cutting wheel 100 and a second cutting wheel 200.

Penetrating holes 101 and 201 are formed at centers of the first and second cutting wheels 100 and 200 to receive a support spindle (not shown). And, unevenly-shaped, or serrated first and second blades 102 and 202 are formed along edges of the first and second cutting wheels 100 and 200, respectively. Protrusions of first and second blades 102 and 202 may also be evenly or unevenly spaced.

The first and second cutting blades 102 and 202 according to the first embodiment of the present invention are preferably made of diamond, which has a hardness greater than that of generally used tungsten carbide, which will extend the endurance of the cutting blades. Moreover, the first and second cutting wheels 100 and 200 can be formed individually to be bonded to a support spindle (not shown) through the penetrating holes 101 and 201, or the cutting wheels 100 and 2000 can be built in one body, i.e., unitary.

When grooves are formed on a liquid crystal display panel using the first and second cutting wheels 100 and 200 according to the first embodiment of the present invention, the rotating first and second blades 102 and 202 along edges of the first and second cutting wheels 100 and 200 come into close contact with the liquid crystal display panel of glass at a uniform pressure so as to form grooves having a predetermined depth.

Figure 6:
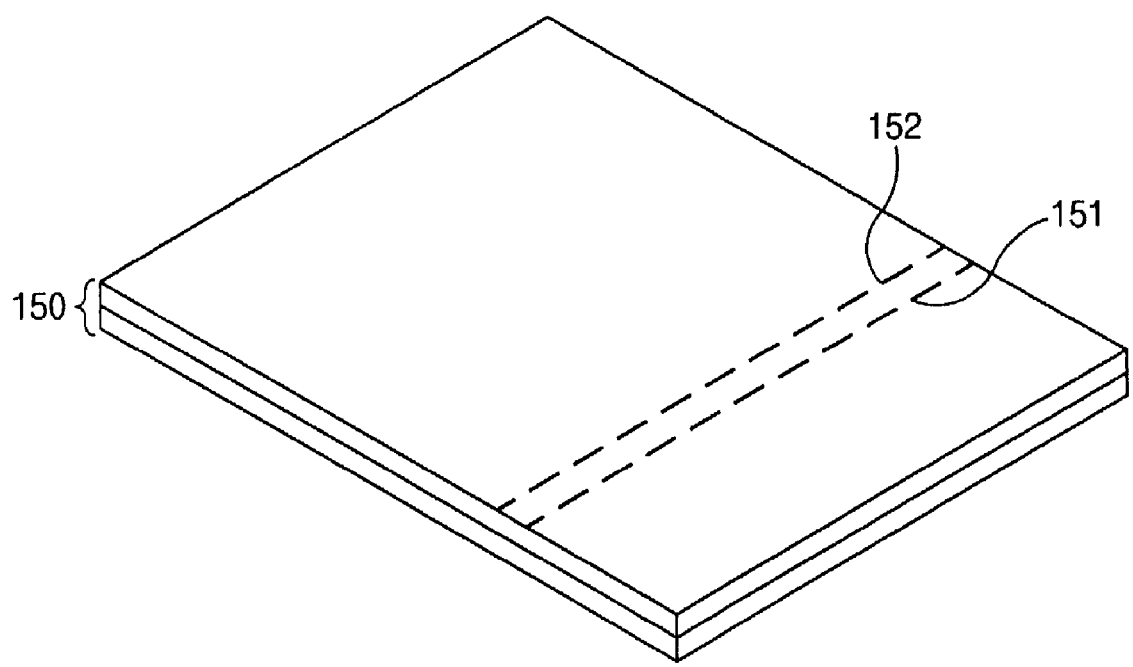
FIG. 6 illustrates an exemplary diagram of first and second grooves formed on a surface of a liquid crystal display panel by first and second cutting wheels.

FIG. 6 illustrates an exemplary diagram of first and second grooves formed on a surface of a liquid crystal display panel using the first and second cutting wheels 100 and 200 according to the first embodiment of the present invention.

Referring to FIG. 6, first groove 151 is formed on a surface of a liquid crystal display panel 150 by first blades 102 of the first cutting wheel 100, and second groove 152 is formed on the surface of the liquid crystal display panel 150 by second blades 202 of the second cutting wheel 200. In this case, the first and second grooves 151 and 152 are shown as a pair of parallel dotted lines. In practice, the first and second grooves 151 and 152 are about 300 μm apart.

In the first embodiment of the present invention, the first and second blades 102 and 202 are formed along the edges of the first and second cutting wheels 100 and 200. The grooves are formed using a pair of the cutting wheels 100 and 200. Hence, the cutting of the liquid crystal display panel can be carried out at a pressure lower than the case of using a single cutting wheel.

Specifically, even if the first blades 102 are partially broken or particles stick to the first blades 102, the second blades 202 are able to form a normal groove on the surface of liquid crystal display panel.

Namely, when the first blade 102 of the first cutting wheel 100 are deteriorated, a groove can be formed on the liquid crystal display panel using the second blade 202 of the second cutting wheel 200 instead of replacing the first cutting wheel 100, as in the related art.

Therefore, the cutting wheel for the liquid crystal display panel according to the first embodiment of the present invention has an extended endurance longer than that of the cutting wheel having the blade according to the related art.

Figure 7:
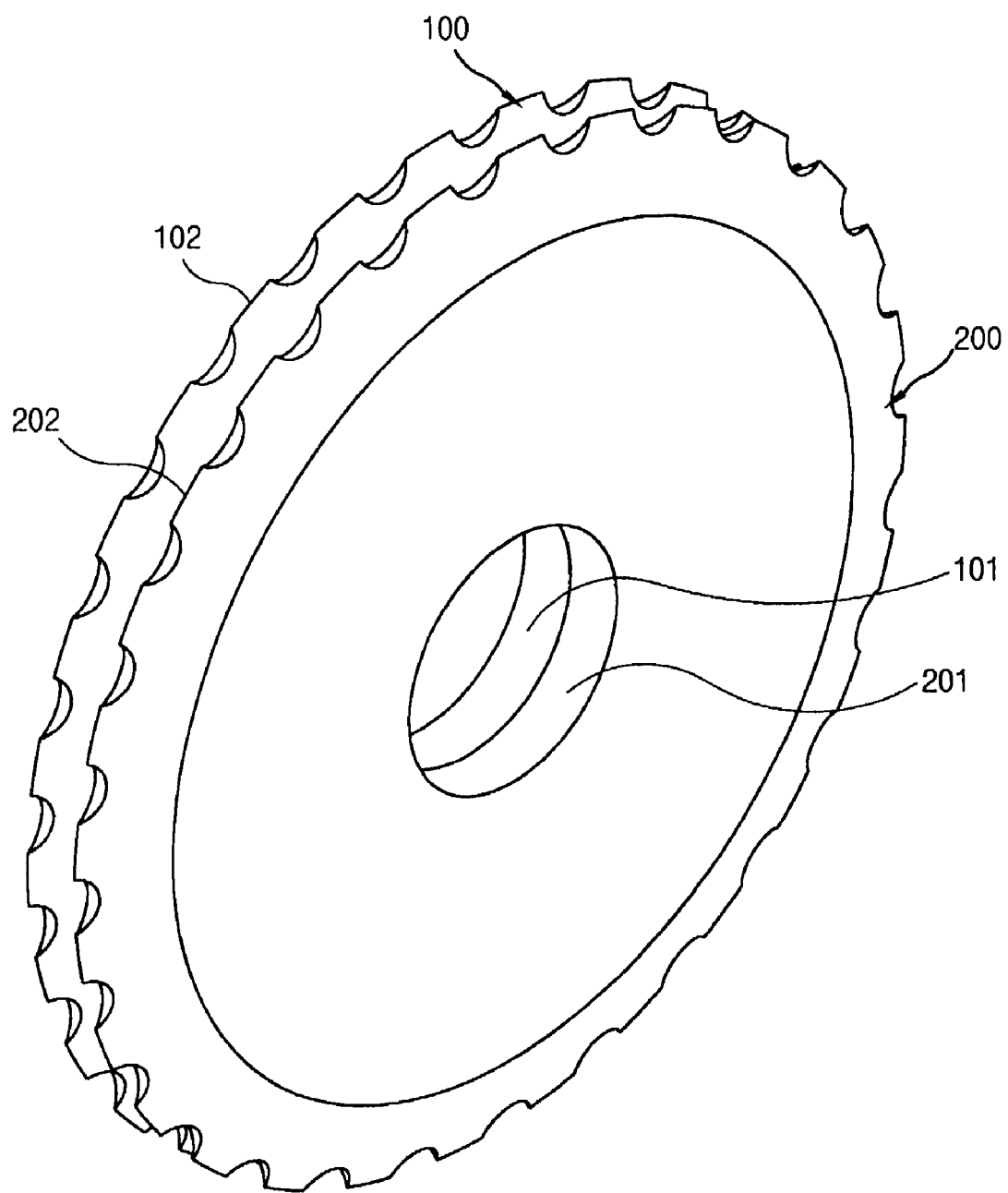
FIG. 7 illustrates a perspective view of first and second cutting wheels having first and second blades are staggered or offset with respect to each other according to a second embodiment of the present invention.

FIG. 7 illustrates a perspective view of first and second cutting wheels 100 and 200, of which first and second blades 102 and 202 are staggered or offset with respect to each other, respectively, according to a second embodiment of the present invention. The offset of the first and second blades 102 and 202 may be at a predetermined angle.

Figure 8:
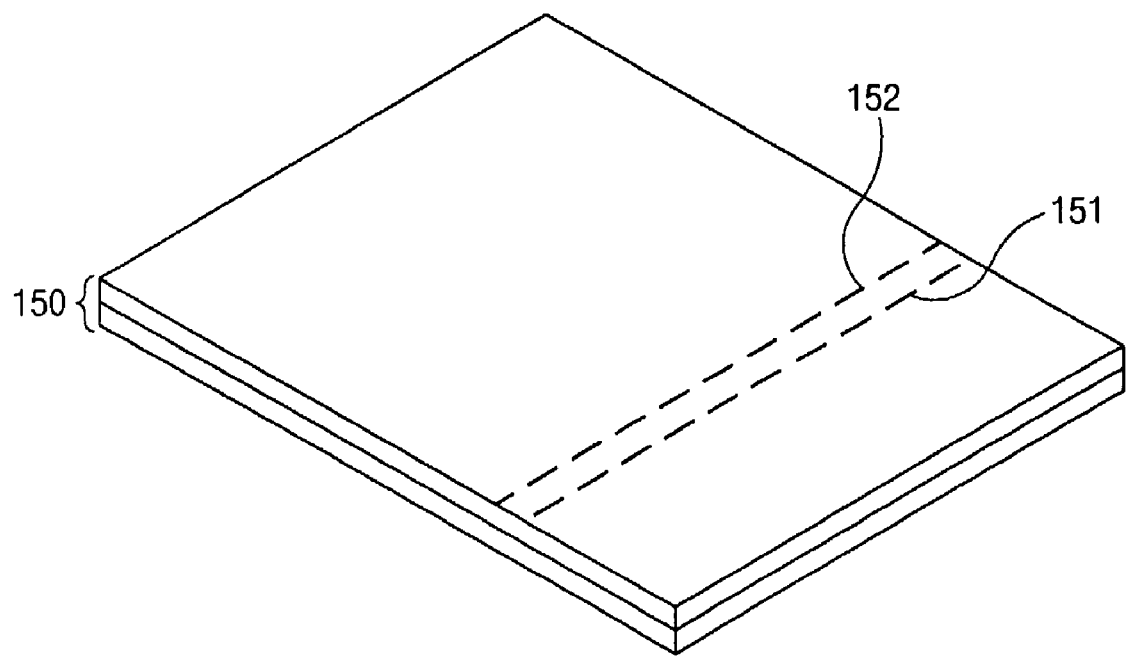
FIG. 8 illustrates an exemplary diagram of first and second grooves formed on a surface of a liquid crystal display panel through first and second cutting wheels in FIG. 7.

Referring to FIG. 7, first and second blades 102 and 202 are arranged so that the blades of the respective wheels 100 and 200 are staggered or offset with respect to each other. First and second groves 151 and 152, as shown in FIG. 8, also alternate with respect to each other on the surface of a liquid crystal display panel 150. Cracks can be propagated well from the first and second grooves 151 and 152. Likewise, even when the first blades 102 of the first cutting wheel 100 are partially broken or particles stick between protrusions of the first blade 102, a groove can be formed on the liquid crystal display panel using the second blade 202 of the second cutting wheel 200 so as to extend the endurance of the cutting wheel.

Figure 9:
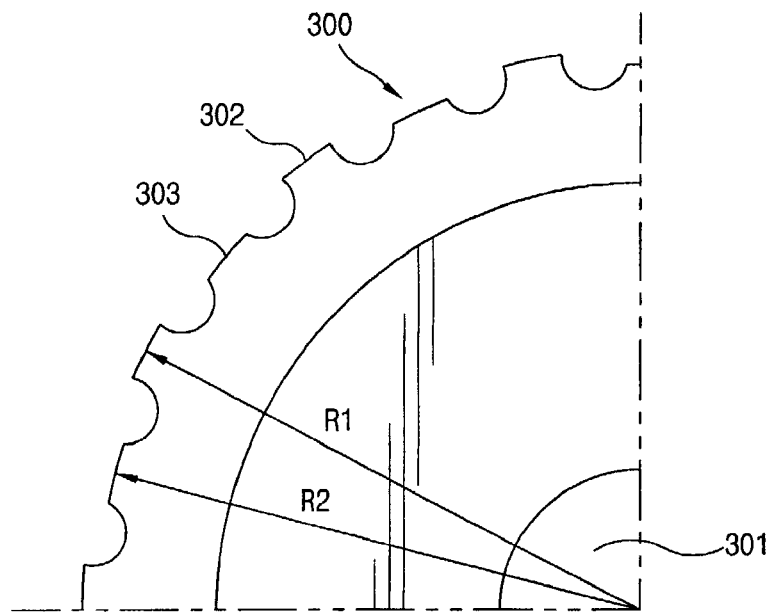
FIG. 9 illustrates an enlarged partial view of a liquid crystal display panel cutting wheel according to a third embodiment of the present invention.

FIG. 9 illustrates an enlarged partial view of a liquid crystal display panel cutting wheel according to a third embodiment of the present invention.

Referring to FIG. 9, a circular cutting wheel 300 includes a penetrating hole 301 at a center to receive a support spindle (not shown), evenly-spaced first blades 302 are formed by grinding front and rear faces of the cutting wheel 300 along edges so that protrusions of the first blades 302 protrude from the center of the cutting wheel 300 at a first radius R1, and evenly-spaced second blades 303 alternating with the first blades 302 respectively so that protrusions of the second blades 303 protrude from the center of the cutting wheel 300 by a second radius R2. The first and second blades 302 and 303 may be unevenly spaced and/or unevenly shaped.

The first and second blades 302 and 303 in FIG. 9 are preferably formed of diamond, which has a hardness greater than that of generally-used tungsten carbide.

Operation of the cutting wheel 300 for a liquid crystal display panel according to a third embodiment of the present invention is explained in detail as follows.

First, the first blades 302 protruding from the center of the cutting wheel 300 by the first radius R1 are made to adhere closely to a liquid crystal display panel at a predetermined pressure and are rotated thereon, to form a groove having a predetermined uniform depth. In this case, even though made of diamond, the first blades 302 are abraded after grooves totaling 6000 m in length have been formed on the plurality of liquid crystal display panels such that a normal groove cannot be formed on the surface of the liquid crystal display panels.

However, when the first blades 302 shown in FIG. 9 have been abraded, the second blades 303 protruding from the center of the cutting wheel 300 by the second radius R2 are capable of forming the normal groove on the surface of the liquid crystal display panels.

Namely, when the first blades 302 are abraded so that the first radius R1 becomes less than the second radius R2 of the second blades 303, the normal groove can be formed on the liquid crystal display panel using the second blades 303 instead of replacing the cutting wheel 300.

Therefore, the cutting wheel according to the third embodiment of the present invention has an extended endurance compared to that of the cutting wheel according to the related art, thereby extending the life of the cutting wheel.

Figure 10:
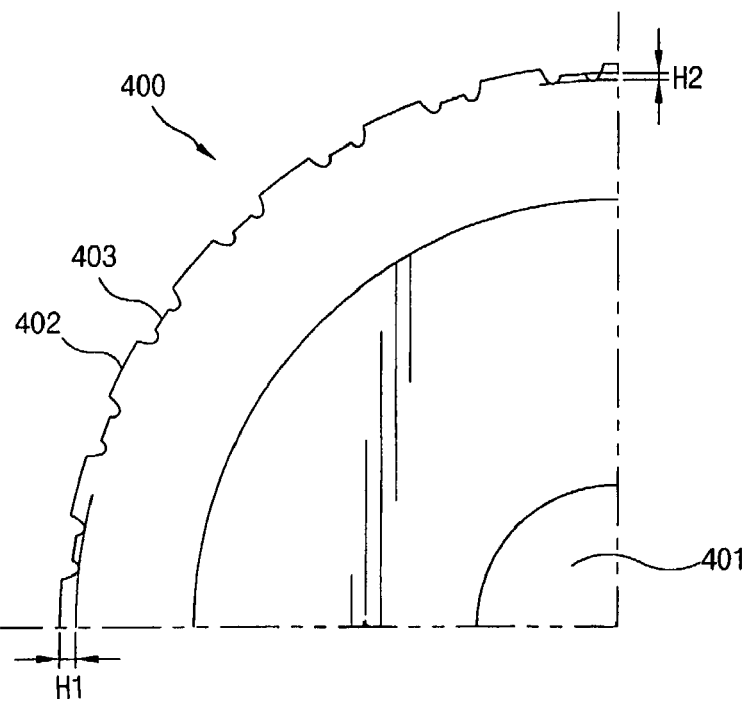
FIG. 10 illustrates an enlarged partial view of a liquid crystal display panel cutting wheel according to a fourth embodiment of the present invention.

FIG. 10 illustrates an enlarged partial view of a liquid crystal display panel cutting wheel according to a fourth embodiment of the present invention.

Referring to FIG. 10, a circular cutting wheel 400 includes a penetrating hole 401 at a center to receive a support spindle (not shown), evenly-spaced first blades 402 formed by grinding front and rear faces of the cutting wheel along edges so as to have a first height H1 from a perceived edge of the cutting wheel 400, and evenly-spaced second blades 403 formed between the first blades 402 so as a second height H2. The first and second blades 402 and 403 may be unevenly shaped and may be unevenly spaced with respect to one another.

When the first blades 402 having the first height H1 have been abraded so as not to form a normal groove on a surface of the liquid crystal display panel, the second blades 403 having the second height H2 are capable of forming the normal groove on the surface of the liquid crystal display panel.

Namely, when the first blades 402 are abraded so that the first height H1 becomes lower than the second height H2 of the second blades 403, the normal groove can be formed on the liquid crystal display panel using the second blades 403 instead of replacing the cutting wheel 400.

Therefore, the cutting wheel according to the fourth embodiment of the present invention has an extended endurance compared to that of the cutting wheel according to the related art, thereby extending the life of the cutting wheel.

Figure 11:
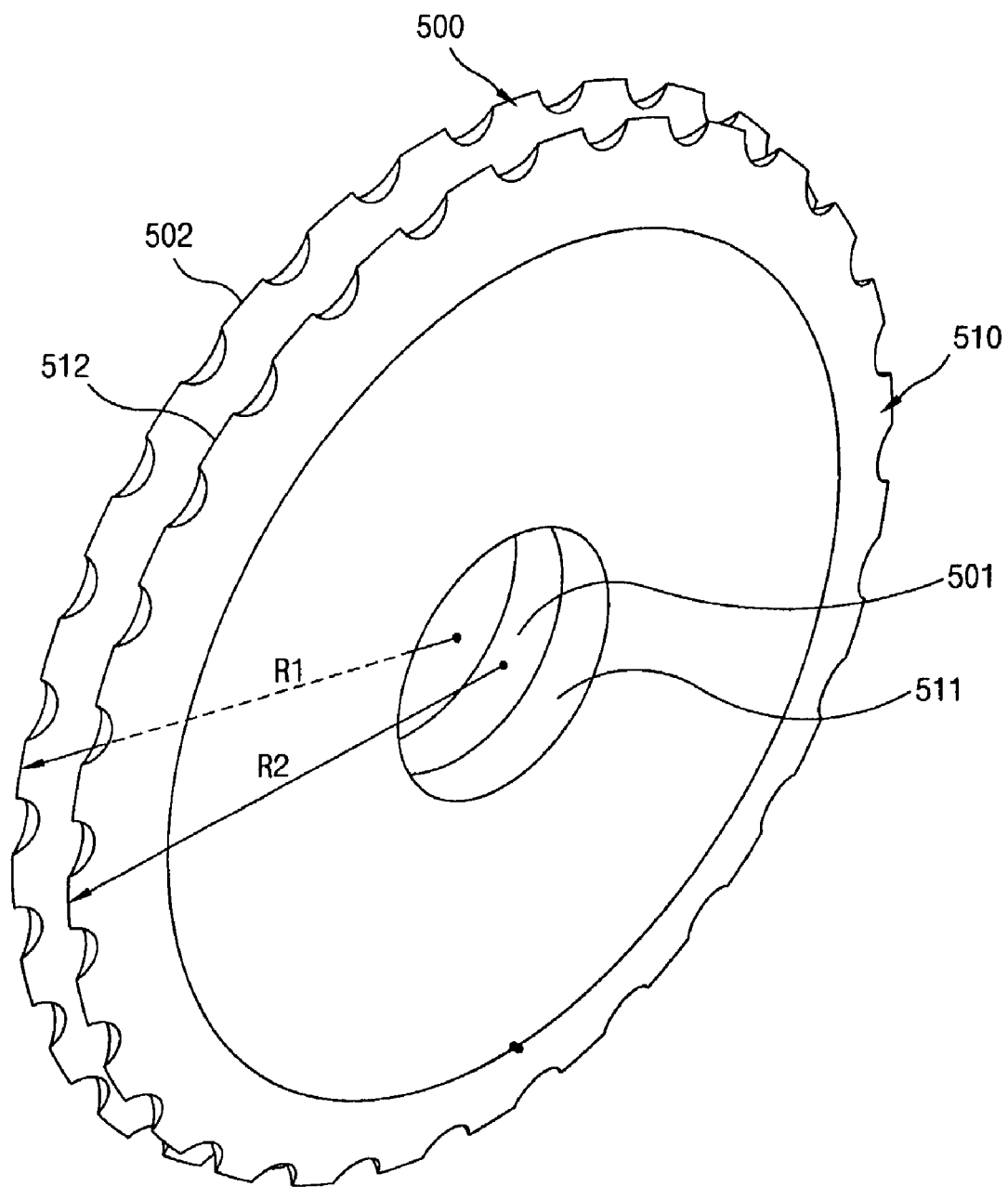
FIG. 11 illustrates an enlarged view of a liquid crystal display panel cutting wheel in part according to a fifth embodiment of the present invention.

FIG. 11 illustrates a perspective view of a liquid crystal display panel cutting wheel according to a fifth embodiment of the present invention.

Referring to FIG. 11, a first circular cutting wheel 500 includes a penetrating hole 501 at a center to receive a support spindle (not shown) and evenly-spaced first blades 502 formed by grinding front and rear faces of the first cutting wheel 500 along an edge to protrude from the center of the first cutting wheel 500 by a first radius R1 and spaced apart from each other by a predetermined interval. A second circular cutting wheel 510 includes a penetrating hole 511 at a center to receive the support spindle and evenly-spaced second blades 512 formed by grinding front and rear faces of the second cutting wheel 510 along an edge to protrude from the center of the second cutting wheel 510 by a second radius R2 and spaced apart from each other by a predetermined interval. The first and second blades 502 and 512 may be unevenly shaped and may be unevenly spaced with respect to each other. The second blades 512 of the second wheel 510 may be offset from the first blades 502 of the first wheel 500, for example, by a predetermined angle.

The first and second cutting wheels 500 and 510 are manufactured individually so as to be bonded to the support spindle through the penetrating holes 501 and 511 or can built in one body, i.e., be unitary.

Like the cutting wheels 300 and 400 for the liquid crystal display panels according to the third and fourth embodiments of the present invention, when the first blades 502 protruding from the center of the first cutting wheel 500 by the first radius R1 have been abraded so as not to form a normal groove on a surface of the liquid crystal display panel, the second blades 512 are capable of forming the normal groove on the surface of the liquid crystal display panel.

Namely, when the first blades 502 of the first cutting wheel 500 are abraded so that the first radius R1 becomes less than the second radius R2, the normal groove can be formed on the liquid crystal display panel using the second blades 512 of the second cutting wheel 510 instead of replacing the first cutting wheel 500.

Therefore, as is the same case of the third or fourth embodiment of the present invention, the cutting wheel for the liquid crystal display panel according to the fifth embodiment of the present invention has an extended endurance compared to that of the cutting wheel according to the related art, thereby extending the life of the cutting wheel.

Accordingly, the cutting wheel for the liquid crystal display panel according to the first or second embodiment of the present invention includes a pair of the same-sized cutting wheels and the blades along the edges respectively, which can be operated under an improved pressure condition compared to the conventional devices. Specifically, the cutting wheel for the liquid crystal display panel according to the first or second embodiment of the present invention is capable of forming a groove on the surface of the liquid crystal display panel continuously even if the blades of one of the cutting wheels are broken in part or particles are attached between the blades, thereby extending the life of the cutting wheel to improve a productivity as well as reduce a cost of purchasing the cutting wheel.

Moreover, the cutting wheel for the liquid crystal display panel according to the third, fourth, or fifth embodiment of the present invention has differentiated protruding heights of the blades formed along the edges of the circular cutting wheel, thereby extending the endurance of the cutting wheel compared to that of the related art. Therefore, the present invention extends the replacement time of the cutting wheel to improve productivity as well as reduce a cost of purchasing replacement cutting wheels.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A cutting wheel assembly, comprising:
a first cutting wheel having a first cutting blade along a periphery thereof, wherein the first cutting blade is serrated such that a first set of intermittent cuts along a surface of a mother substrates is formed when the first cutting wheel is operatively placed thereon in order to cut the mother substrates into individual liquid crystal display panels; and
a second cutting wheel having a second cutting blade along a periphery thereof, wherein the second cutting blade is serrated such that a second set of intermittent cuts along a surface of the mother substrates is formed when the second cutting wheel is operatively placed thereon in order to cut the mother substrates into individual liquid crystal display panels,
wherein the first and second cutting wheels are unitary or bonded together, and attached to a support spindle such that the first and second sets of intermittent cuts are formed simultaneously on the mother substrates when the first and second cutting wheels are operatively placed thereon wherein each serration of the first cutting wheel makes an individual cut on the first set of intermittent cuts; and wherein each serration of the second cutting wheel make an individual cut on the second set of intermittent cuts.

2. The assembly of claim 1, wherein the first and second cutting wheels have the same shape and are rotated with respect to each other such that serrations of the first cutting blade and serrations of the second cutting blade are offset with respect to each other by a particular angle.

3. The assembly of claim 1, wherein at least one of the first cutting blade and the second cutting blade is serrated such that their serrations are evenly spaced.

4. The assembly of claim 1, wherein at least one of the first cutting blade and the second cutting blade is serrated such that their serrations are unevenly spaced.

5. A cutting wheel for a liquid crystal display panel, comprising:
- a first circular wheel, including a first cutting blade along an edge of the first circular wheel, wherein the first cutting blade includes a first plurality of spaced protrusions used to create a first set of intermittent cuts on a surface of mother substrates being cut into individual liquid crystal display panels, wherein each protrusion of the first circular wheel makes an individual cut on the first set of intermittent cuts;
- a second circular wheel, including a second cutting blade along an edge of the second circular wheel, wherein the second cutting blade includes a second plurality of spaced protrusions used to create a second set of intermittent cuts on the mother substrates being cut into individual liquid crystal display panels, wherein each protrusion of the second circular wheel make an individual cut on the second set of intermittent cuts;
- wherein the first circular wheel and the second circular wheel are separate elements bonded together or are formed as a unitary element,
- wherein the first circular wheel and the second circular wheel each have a penetrating hole at a center thereof to receive a support shaft,
- wherein the relative orientation of the first circular wheel and the second circular wheel is turned with respect to each other for offsetting of the first and second cutting blades in a circumferential direction; and
- a concave portion formed between a circumference of the first circular wheel and a circumference of the second circular wheel,
- wherein the first and second cutting blades are formed of diamond,
- wherein the first and second cutting blades have the same shape.

* * * * *